Patented Mar. 29, 1932

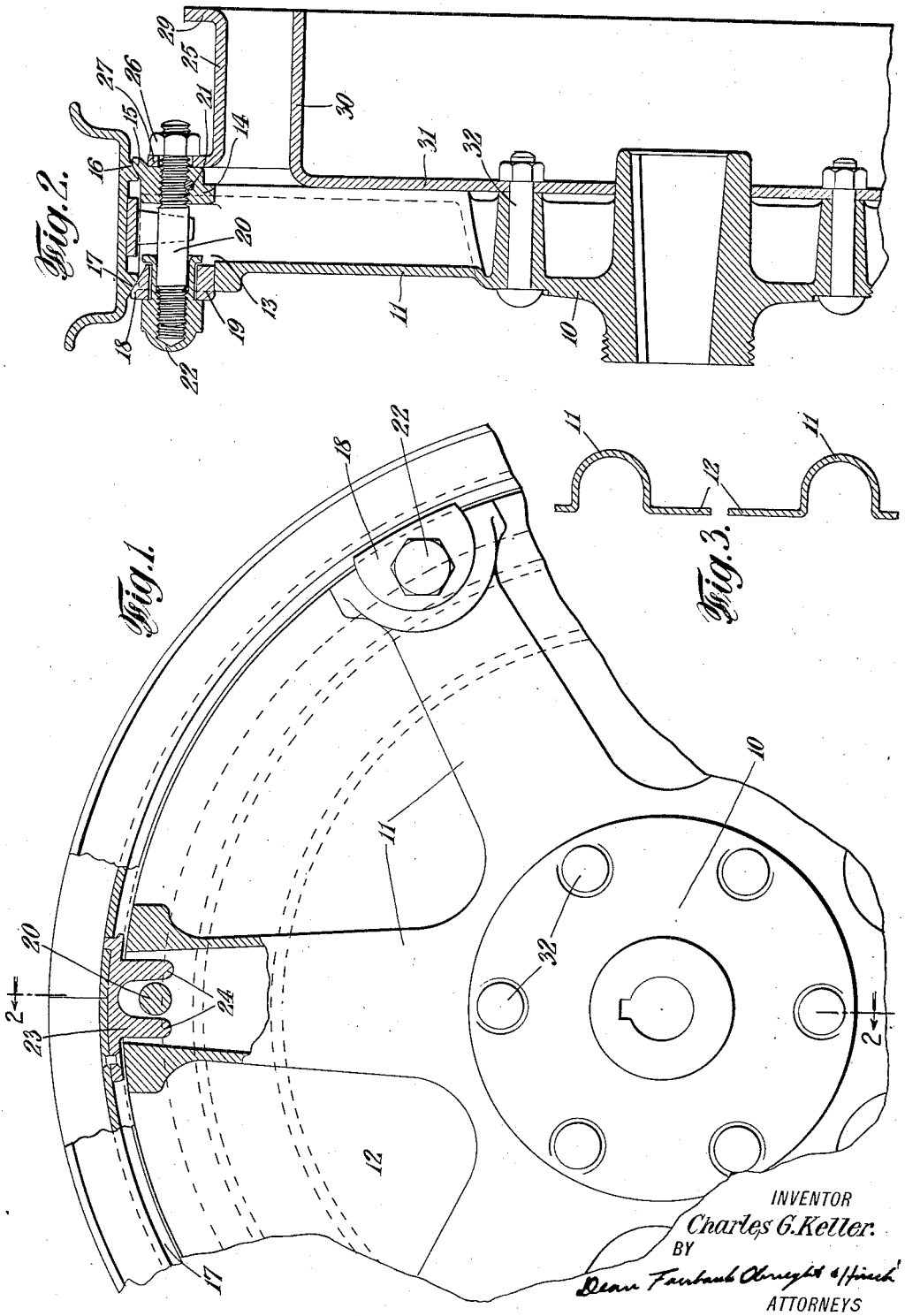

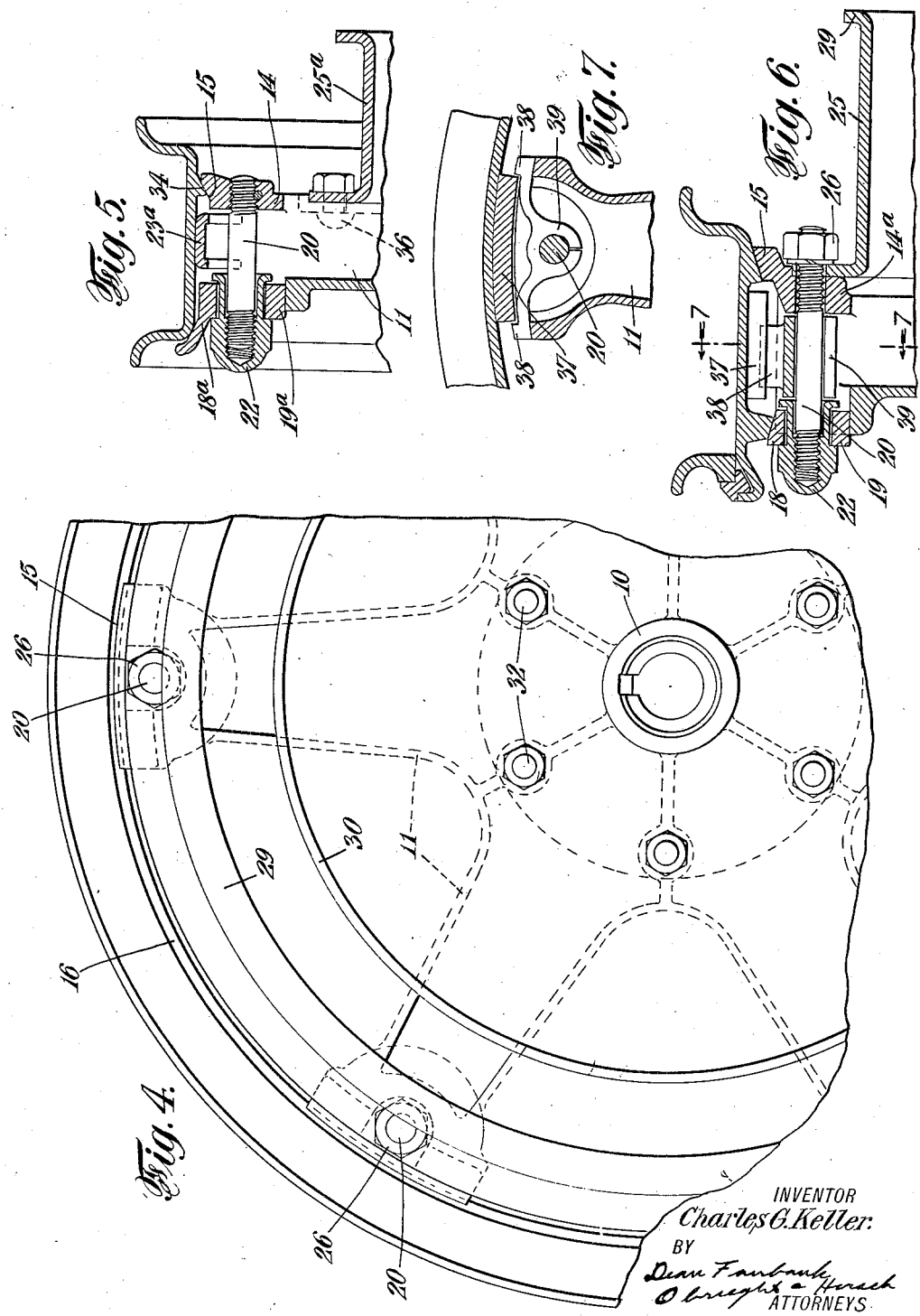

1,851,187

UNITED STATES PATENT OFFICE

CHARLES GEORGE KELLER, OF POUGHKEEPSIE, NEW YORK

VEHICLE WHEEL

Application filed April 26, 1927. Serial No. 186,628.

My invention relates particularly to a type of construction in which the tire carrying rim is detachably secured directly to the spoke ends and the usual felly is omitted.

As one important feature of my improved construction, the tire carrying rim, the spoke ends and the connecting parts are so formed that a single rim is supported by and clamped to the spokes at opposite sides of the rim.

As another important feature, the bolts used for clamping the rims on the wheel are also used for clamping a brake drum to the wheel.

As another important feature, the tire carrying rim, the spoke ends and their connections are so constructed that wedging effects are obtained at both edges of the rim.

As a further important feature, creeping between the rim and the wheel is prevented by novel means projecting radially inwardly from the rim. Such means may form a part of the connection at the joint in the rim and may engage the bolt cooperating with a spoke to secure the rim on the wheel.

Certain features of the construction herein illustrated are disclosed and claimed in my copending application Serial No. 182,199, filed April 9, 1927, the construction illustrated in said application being for a dual rim wheel.

In the accompanying drawings, I have illustrated certain embodiments of my invention but these are to be considered in an illustrative rather than in a limiting sense.

Fig. 1 is an end view of a portion of a wheel embodying one form of my invention, part of the structure being broken away;

Fig. 2 is a section on the line 2—2 of Fig. 1;

Fig. 3 is a sectional view illustrating the spokes as formed by beads or corrugations in the web;

Fig. 4 is a view similar to Fig. 1, but of the other side of the wheel;

Figs. 5 and 6 are views similar to a part of Fig. 2, but showing different details of construction; and Fig. 7 is a section on the line 7—7 of Fig. 6.

The wheel shown in Figs. 1, 2, 3 and 4 is of the fellyless form, including a hub 10 and a plurality of spokes 11, which may be formed as a single integral casting. The spokes 11 are preferably of U-shape in cross section and may be connected by a web 12, so as to form ribs on the outboard side and grooves on the inboard side of a disk. The radially outward edge of the web may be at any distance from the center, and in some constructions the web may be omitted if desired. The wheel body casting is so designed that it may be made by the use of a two part green sand mold without the use of any cores and the casting may be machined to the final form by only a few simple operations.

For securing the tire rim to the spoke ends the radially outward end or head of each spoke is provided with a recess 13 approximately semi-cylindrical in form with the axis of the cylindrical surface paralleling the axis of the wheel. At the hub cap side, that is, the outboard side of the wheel the recess is open, but at the opposite or inboard side it is closed by an end wall or bridge piece 14. The peripheral surface of the wall is curved concentrically with the wheel and has a portion 15 which is also axially inclined from a smaller diameter toward the outboard side of the wheel to a larger diameter toward the inboard side of the wheel.

My improved wheel is adapted to carry a removable rim having an inclined surface or shoulder portion 16 which may be on an annular bead near the inboard edge of the rim and adapted to coact with the inclined peripheral surfaces 15 of the end walls 14 on the several spokes. The rim is also provided with an inclined surface or shoulder portion 17 which may be on a bead near the outboard edge of the rim. For engaging this, I provide a lug, slide or collar 18 having a substantially semi-cylindrical surface adapted to fit the semi-cylindrical recess 13, and an arcuate surface 19 axially inclined in a direction which is the reverse of the taper or inclination of the surface 15 of the end wall 14. The engaging surfaces of the recesses 13 and the lugs or collars 18 may extend through a little over 180° so that the lugs cannot move radially out of the recesses and are guided in and out axially. It should be understood that the end wall 14 may be constructed so that the inclined surface 15 thereof will engage the inboard edge of the rim itself, and that the internal bead near the outboard edge of the rim may be rendered unnecessary by a suitable change in the shape of the lugs 18.

By forcing or drawing the lugs 18 toward the inboard walls 14, the rim will be tightly wedged or clamped in place on the spokes. For this purpose one end of a bolt 20 is rigidly secured to the wall 14 at the inboard side of each recess 13. It may be locked in said wall threading and if necessary by suitable means such as a pin 21 forced through an opening in said wall 14 and engaging the side of the bolt. Each lug or collar 18 has an aperture to receive the outboard end of the corresponding bolt 20 and is forced into place to clamp the rim by means of a nut 22 threaded on the outboard ends of said bolts. It is advantageous to reduce the number of separate parts to be kept track of during changes of rims and tires. To this end the nut 22 is swivelled in each lug or collar 18 by means of a sleeve extending through the lug or collar and turned back as by spinning to prevent separation of the two parts.

In order to prevent creeping of the tire on the rim use may be made of the device which is used to fasten together the two ends of the rim. As shown in Fig. 1, the fastening member 23 is riveted to one end of the rim and is provided with a lug to enter a recess in the other end of the rim to hold the two ends together. This member is provided with two substantially radially extended lugs 24 of sufficient length to include therebetween the bolt 20 at the end of the corresponding spoke. It will be seen that these lugs might also act to prevent creeping by engagement with the sides of the spoke even if the lugs were not of sufficient length or spacing to cooperate with the bolt. The lugs 24 are short enough so as to pass into or out of the recess 13 at the end of the corresponding spoke.

The rear end of the bolts 20 may project from the spokes and may be used for securing a brake drum 25 to the wheel. The brake drum 25 is provided at suitable positions with apertures to receive the inboard ends of the bolts 20 so that the brake drum may be clamped by nuts 26. An important feature of the present invention resides in the brake drum 25 and the manner of making the same. This brake drum is formed by taking strip or sheet metal of proper width and forming it into annular shape with suitable flanges at one or both edges, the ends of the strip then being butt-welded to complete the brake drum. The flange 27 at the outboard side is provided with openings to receive the outboard ends of the bolts 20, and to enable the brake drum 25 to be secured in position by the nuts 26. A flange 29 may be provided at the other edge of the drum to reinforce the latter. The wheel may be provided with a brake drum 30 having at one edge a web 31 provided at its center with an opening to receive the inboard end of the hub and fit thereon. The web 31 is bolted to the hub 10 by bolts 32. Either one of these brake drums may be omitted, or in some cases, both may be used for two separate sets of brake bands or shoes.

In Fig. 5 there is shown a different form of rim which may be of a standard form and has but a single internal rib having an inclined axially inward surface 34 tapering from a smaller diameter to a larger one toward the outboard side of the wheel and adapted to engage the inclined surface 15 on the wall 14. This tire is fastened on the wheel by means of a bolt 20 and a nut 22 such as described with reference to Fig. 2 and a lug or collar 18a which corresponds in general with collar or lug 18 but instead of engaging a bead at the interior of the tire as shown in Fig. 2 is extended so as to engage the rim at the outboard side thereof. In this form creeping of the rim may be prevented by a device 23a which may be similar in general to the corresponding device 23 shown in Figs. 1 and 2 and may be formed of sheet metal and secured in position on the rim in any suitable manner as by spot welding. The brake drum 25a is made the same as the brake drum 25 shown in Fig. 2, but is secured by bolts 36 to the web between successive spokes. The edge of the web may be spaced some distance from the rim and may present an edge lip to hold the drum concentric with the wheel.

In Figs. 6 and 7 there is illustrated another embodiment of means for preventing creeping. In this case a member 37 is secured to the rim as by spot welding and this is positioned, when the tire is in place, between lugs 38 extending radially outward and forming part of a member 39 having a sleeve through which the corresponding bolt 20 passes. Portions of the member 39 carrying the lugs 38 extend over and may be supported by the walls at the sides of the spoke. The other parts are shown similar to the corresponding parts of Figs. 1 to 4.

The brake drum as an article of manufacture is not claimed herein, but is claimed in my Patent 1,768,959, issued July 1, 1930, on a division of the present application.

Having thus described my invention, what I claim as new and desire to secure by Letters Patent is:

1. A vehicle wheel having a plurality of hollow spokes, the inboard side of each spoke at its radially outer end having a wall presenting an axially facing surface for abutment with the radial flange of a brake drum, and a rim seat on the peripheral surface, a bolt extending through said wall and having its opposite ends projecting axially therefrom in opposite directions, means for rigidly securing said bolt in said wall and against longitudinal or rotational movement, a nut on one end of said bolt for securing said flange of the brake drum against said surface, and a nut on the opposite end of said bolt for forcing a rim onto said rim seat.

2. A vehicle wheel having a plurality of spokes, the inboard side of each spoke at its radially outer end having a circumferentially extending wall presenting an axially facing surface and an outward radially facing rim seat, a bolt extending through said wall and having its opposite ends threaded and projecting axially therefrom in opposite directions, a nut on one end of said bolt for holding the flange of the brake drum against said surface, and a nut on the opposite end of said bolt for holding a rim on said rim seat.

3. A vehicle wheel having a plurality of hollow spokes, the inboard side of each spoke at its radially outer end having a wall presenting a rim seat, a lug slidably mounted in the outboard wall of each spoke and presenting a rim seat, a rim having spaced annular flanges for engagement with and between said rim seats, a bolt secured to said wall and projecting axially in an outboard direction, a nut on said bolt for forcing said rim seats together to hold the rim against axial movement in respect to the wheel, and means on said rim between said flanges and projecting into the radially outer end of one of said spokes for engagement with the bolt to prevent circumferential movement of the rim in respect to the wheel.

4. A vehicle wheel having a plurality of spokes, each substantially U-shaped in cross-section, the inboard open side of each spoke at its radially outer end having a circumferentially extending wall presenting an axially facing surface for abutment with the radial flange of a brake drum and also presenting a rim seat, a bolt extending through said wall and projecting axially therefrom in opposite directions, means for holding said bolt against longitudinal movement in respect to said wall, means on one end of said bolt for securing said flange of the brake drum against said surface, and means on the other end of said bolt for holding a rim on said rim seat.

Signed at Poughkeepsie in the county of Dutchess and State of New York, this 22 day of April A. D. 1927.

CHARLES GEORGE KELLER.